(12) United States Patent
Yamanaka et al.

(10) Patent No.: US 7,665,572 B2
(45) Date of Patent: Feb. 23, 2010

(54) VEHICLE STEERING SYSTEM

(75) Inventors: Kosuke Yamanaka, Kashihara (JP); Shiro Nakano, Minamikawachi-gun (JP); Daisuke Maeda, Kashiwara (JP)

(73) Assignee: JTEKT Corporation, Osaka-shi (JP)

( * ) Notice: Subject to any disclaimer, the term of this patent is extended or adjusted under 35 U.S.C. 154(b) by 0 days.

(21) Appl. No.: 11/772,430

(22) Filed: Jul. 2, 2007

(65) Prior Publication Data
US 2008/0017435 A1 Jan. 24, 2008

(30) Foreign Application Priority Data
Jul. 18, 2006 (JP) ............... 2006-196146

(51) Int. Cl.
*B62D 5/04* (2006.01)
(52) U.S. Cl. .................... 180/444; 402/443
(58) Field of Classification Search ............. 180/443, 180/444, 402
See application file for complete search history.

(56) References Cited
U.S. PATENT DOCUMENTS 5,092,190 A * 3/1992 Kubo et al. ............... 74/410
6,896,090 B2 * 5/2005 Kanda et al. ............ 180/402
7,144,346 B2 * 12/2006 Hermann et al. .......... 475/19
7,244,214 B2 * 7/2007 Shimoyama et al. ...... 475/335
2005/0046290 A1 * 3/2005 Baukholt et al. ......... 310/75 R
2005/0205340 A1 * 9/2005 Shimoyama et al. ...... 180/444

FOREIGN PATENT DOCUMENTS
JP        2005-343205         12/2005

* cited by examiner

*Primary Examiner*—Paul N Dickson
*Assistant Examiner*—Tashiana Adams
(74) *Attorney, Agent, or Firm*—Oblon, Spivak, McClelland, Maier & Neustadt, L.L.P.

(57) ABSTRACT

A vehicle steering system is provided which includes a variable angle ratio mechanism for changing an angle ratio of a steering angle of a steering member to a turning angle of a steering mechanism, the variable angle ratio mechanism including a first sun gear connected to a steering column, a second sun gear connected to the steering mechanism, and planetary gears each having a first toothed portion and a second toothed portion which are adapted to mesh with the first and second sun gears respectively, and are arranged to be spaced apart from each other in a tooth face width direction, the first toothed portion and the second toothed portion being formed integrally through forging.

4 Claims, 4 Drawing Sheets

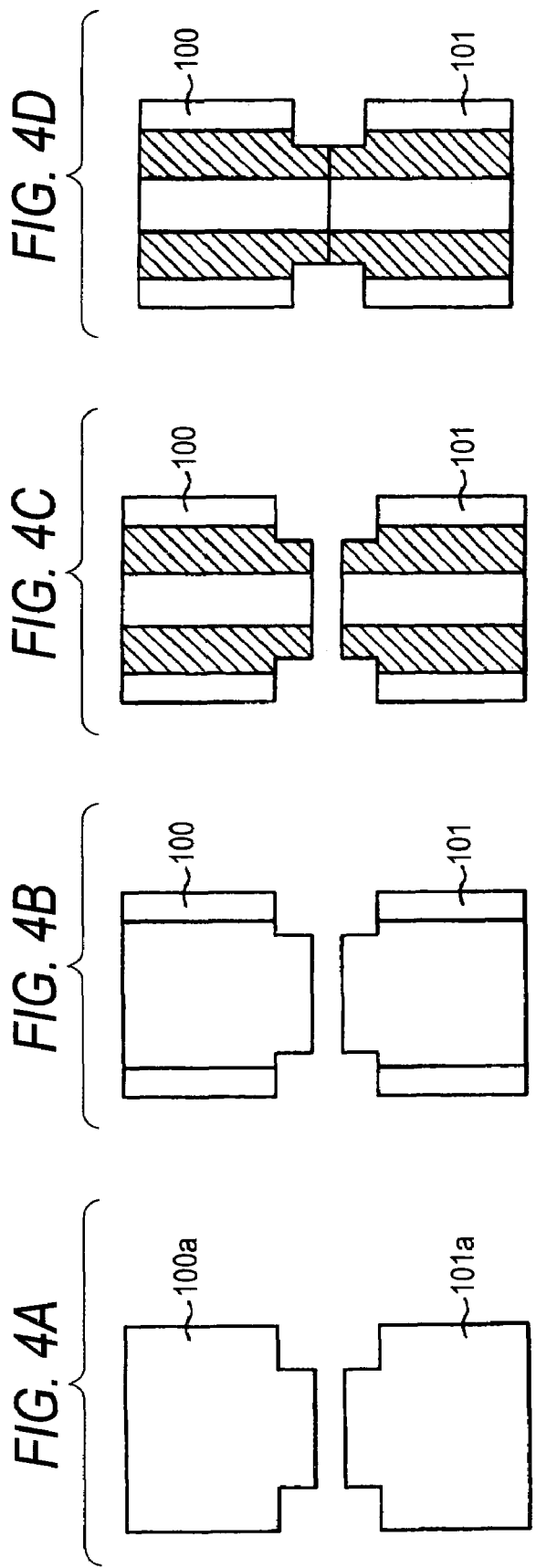

VEHICLE STEERING SYSTEM

BACKGROUND OF THE INVENTION

1. Field of the Invention

The present invention relates to a vehicle steering system including a angle variable mechanism for changing an angle ratio of a steering angle of a steering member to a turning angle of a steering mechanism for turning left and right steered wheels.

2. Related Art

A variable angle ratio mechanism included in a vehicle steering system is made up of a first sun gear which is connected to a steering member such as a steering wheel, a second sun gear which is disposed coaxially with the first sun gear and is connected to a steering mechanism, a first planetary gear which meshes with the first sun gear, a second planetary gear which meshes with the second sun gear and rotates together with the first planetary gear, a carrier which supports the first and second planetary gears in such a manner as to freely rotate about their own axes and revolve around the sun gears, and an electric motor for rotating the carrier, and is configured to rotate the second sun gear via the first sun gear, the first planetary gear and the second planetary gear and also to rotate the second sun gear at increased speeds via the carrier by virtue of driving by the electric motor, so as to change the angle ratio of steering angle to turning angle (for example, JP-A-2005-343205). In addition, a connecting shaft is press fitted in shaft holes opened in their rotational centers of the first and second planetary gears for integral connection thereof.

There is known a vehicle steering system which includes such a variable angle ratio mechanism in which one ends of the first and second planetary gears which are formed by cutting are butted against each other, and the butted portion is welded so as to integrally connect the first and second planetary gears together. FIGS. 4A to 4D are explanatory drawings which show steps of connecting first and second planetary gears 100, 101 through welding. Gear wheel materials 100a, 101a each having a large diameter portion and a small diameter portion which continuously connects to the large diameter portion are molded by molds (FIG. 4A), teeth are cut into the large diameter portions of the gear wheel materials 100a, 101a by a hobbing machine (FIG. 4B), following this, a heat treatment such as quenching is applied thereto, then, shaft holes are opened in central portions of the gear wheel materials (FIG. 4C), the small diameter portions of two resulting planetary gears 100, 101 are butted against each other after tooth faces thereof are ground, and the butted portion is welded (FIG. 4D). Then, a shaft element is press fitted in the shaft holes of the respective planetary gears 100, 101.

In a variable angle ratio mechanism in which first and second planetary gears are connected together by a connecting shaft as done in JP-A-2005-343205, however, teeth cutting work needs to be performed in a separate step, and moreover, a circumferential phase matching between the first and second planetary gears is difficult, there having been a demand for improvement in this respect.

In addition, in a variable angle ratio mechanism in which two planetary gears are connected together through welding, since there are necessary the steps of molding two gear wheel materials, cutting teeth in the gear wheel materials, applying a heat treatment to the same, opening shaft holes therein, grinding them and welding together the resulting gear wheels, the number of machining steps is increased, leading to a problem that the production costs of planetary gears and hence a vehicle steering system are increased. In addition, strain is generated in the connecting portion due to heat being applied to the planetary gears which is generated in association with welding, which causes a circumferential phase deviation between the first and second planetary gears, leading to a problem of increasing a difference between a backlash amount at a meshing portion between the first sun gear and the first planetary gear and a backlash amount at a meshing portion between the second sun gear and the second planetary gear. In addition, since the small diameter portions of the first and second planetary gears need to be formed relatively long so as to secure a space necessary for welding, the overall length in the tooth face width direction of the planetary gear is increased, leading to a problem the variable angle ratio mechanism has to be made large in size.

SUMMARY OF THE INVENTION

The invention was made in view of the situations, and a main object thereof is to provide a vehicle steering system which can decrease the number of machining steps of producing a planetary gear, eliminate the circumferential phase deviation in the planetary gears and decrease the overall length in the tooth face width direction of the same.

According to a first aspect of the invention, there is provided a vehicle steering system including a variable angle ratio mechanism for changing an angle ratio of a steering angle of a steering member to a turning angle of a steering mechanism, the variable angle ratio mechanism including, in turn, a first sun gear connected to the steering member, a second sun gear connected to the steering mechanism, and planetary gears each having a first toothed portion and a second toothed portion which are adapted to mesh with the first and second sun gears, respectively, and are arranged to be spaced apart from each other in a tooth face width direction, the first toothed portion and the second toothed portion being formed integrally through forging.

According to a second aspect of the invention, there is provided a vehicle steering system according to the first aspect of the invention, wherein the first toothed portion and the second toothed portion are formed from respective end edges in the tooth face width direction towards a center of the planetary gear.

According to the first and second aspects of the invention, since the first toothed portion and the second toothed portion of the planetary gear are formed integrally through forging, the number of machining steps of the planetary gear can be reduced, whereby the production costs of the planetary gears and hence the vehicle steering system can be reduced. Moreover, since the toothed portions are formed integrally through forging, the circumferential phase deviation between the first toothed portion and the second toothed portion can be eliminated, and the backlash amounts at the meshing portions with the first and second sun gears can be made even, thereby making it possible to reduce chattering due to backlash. In addition, since a non-toothed portion between the first toothed portion and the second toothed portion can be reduced, and hence, the overall length in the tooth face width direction of the planetary gear can be made short, whereby the planetary gear and hence the vehicle steering system which incorporates therein the planetary gear can be made small in size. Additionally, since tooth surfaces of the first toothed portion and the second toothed portion can be pressure hardened, the heat treatment such as quenching can be omitted. Furthermore, since the tooth surfaces so pressure hardened are made smoother than tooth surfaces which are formed by cutting, sliding noise can be reduced which is generated when tooth surfaces of the toothed portions are brought into sliding contact with each other.

BRIEF DESCRIPTION OF THE DRAWINGS

FIGS. 4A through 4D are explanatory diagrams illustrating steps of connecting through welding planetary gear wheels for a conventional vehicle steering system.

DETAILED DESCRIPTION OF THE PREFERRED EMBODIMENTS

Figure 1:
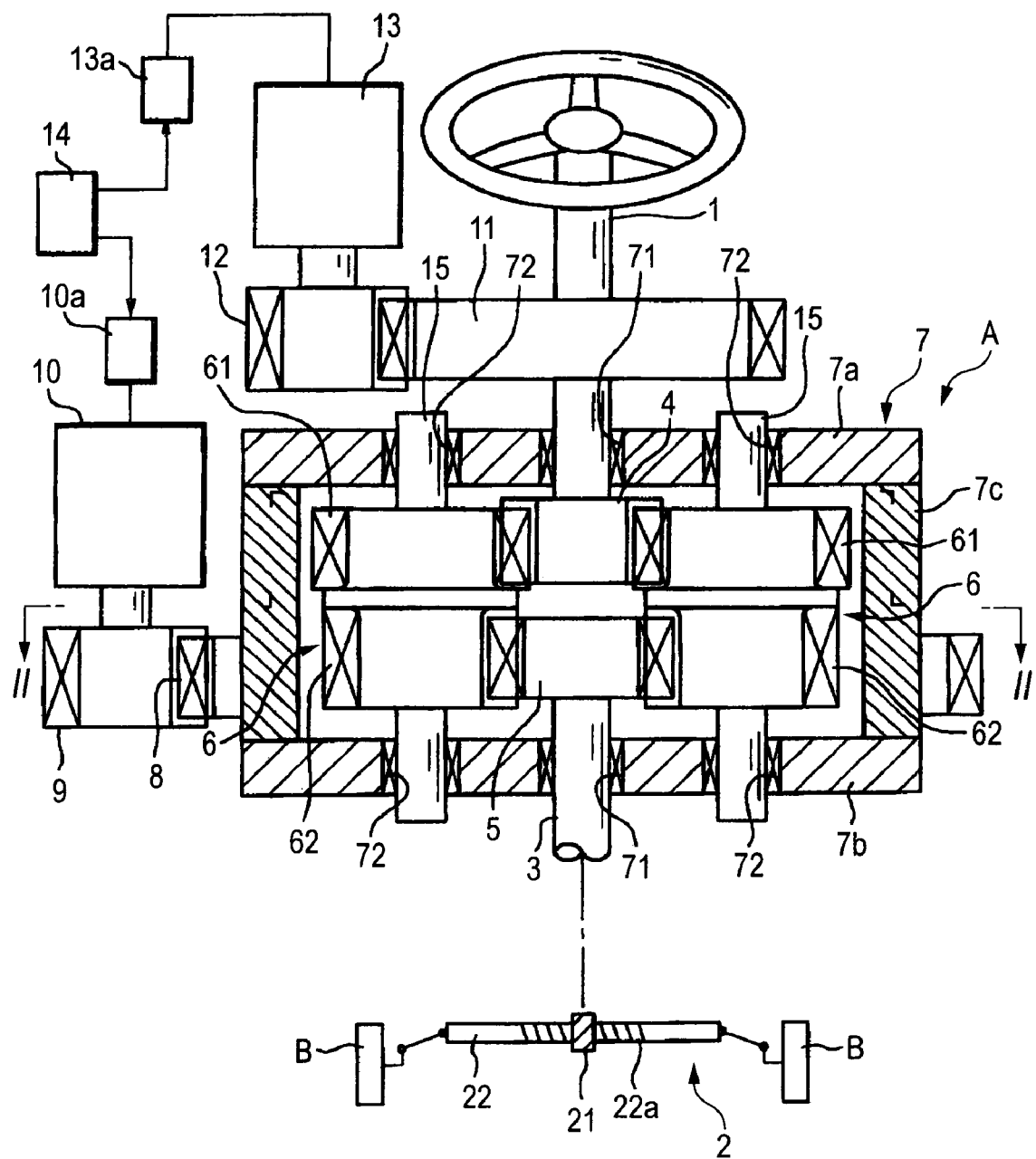
FIG. 1 is an exemplary diagram showing the configuration of a vehicle steering system according to the invention.
Figure 2:
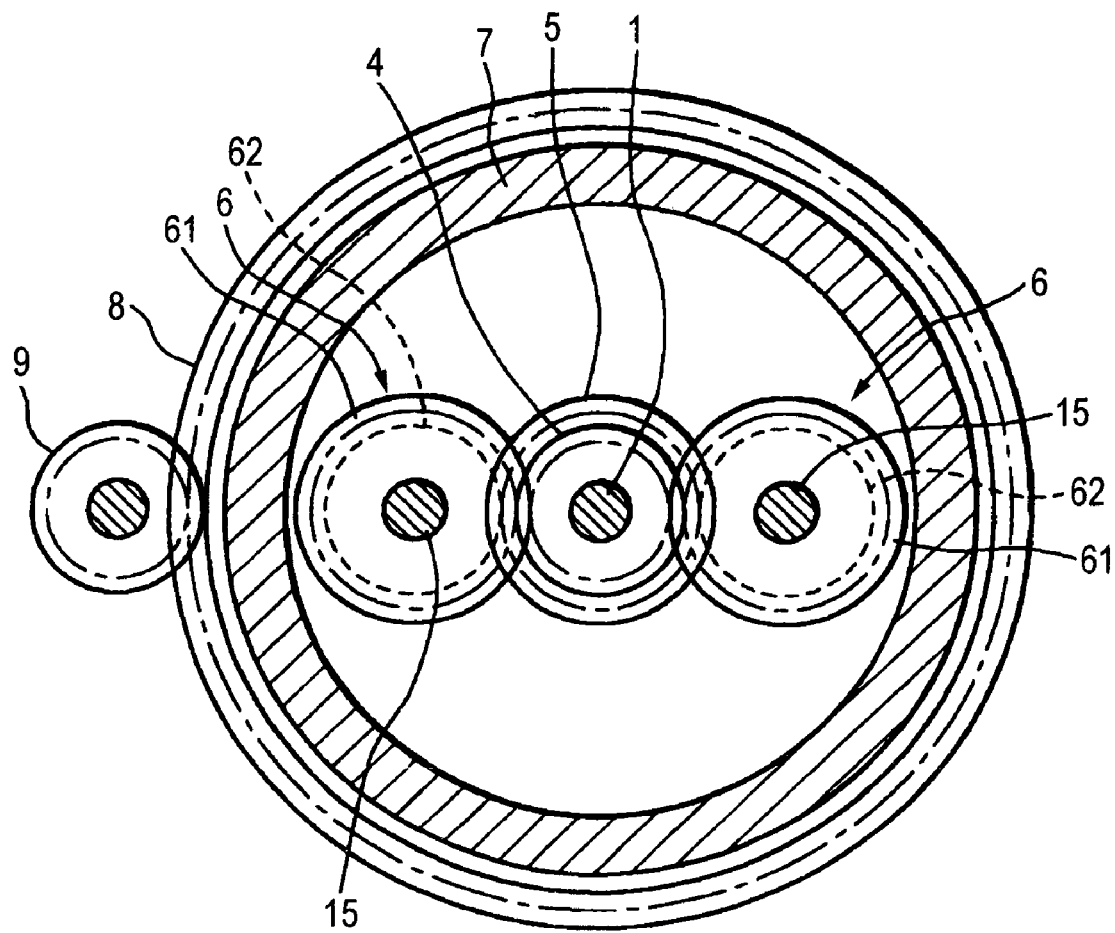
FIG. 2 is a sectional view taken along the line II-II in FIG. 1.

Hereinafter, an embodiment of the invention will be described in detail based on the drawings. FIG. 1 is an exemplary diagram showing the configuration of a vehicle steering system according to the invention, and FIG. 2 is a sectional view taken along the line II-II in FIG. 1.

This vehicle steering system includes a steering column 1, to an upper end of which a steering wheel (the steering member) is connected, and a variable angle ratio mechanism A, which is provided between an upper end of a transmission shaft or pinion shaft 3 of a steering mechanism 2 which includes a pinion 21 connected to the other end of the pinion shaft 3 and a turning shaft or rack shaft 22 having rack teeth 22a adapted to mesh with the pinion 21 and adapted to move in axially longitudinal directions and a lower end of the steering column 1 for changing an angle ratio of a steering angle of the steering column 1 to a turning angle of the steering mechanism 2, whereby steered road wheels B, B which are supported on both end portions of the rack shaft 22, respectively, can be steered as a result of turning of the steering column 1.

The variable angle ratio mechanism A includes a first sun gear 4 which is provided at the lower end of the steering column 1, a second sun gear 5 which is disposed coaxially with the first sun gear 4 and is provided at the upper end of the pinion shaft 3, a plurality of planetary gears 6 each having a first toothed portion 61 adapted to mesh with the first sun gear 4 and a second toothed portion 62 adapted to mesh with the second sun gear 5, a carrier 7 which supports the planetary gears 6 in such a manner as to freely rotate about their own axes and revolve around the sun gears, an externally toothed element 8 which is provided on an outer circumferential portion of the carrier 7, and an electric motor 10 having a first drive gear 9 which meshes with the externally toothed element 8 and functioning as a differential actuator for rotating the carrier 7.

In addition, the vehicle steering system includes a transmission gear 11 provided in an intermediate position along the steering column 1 and an electric motor 13 having a second drive gear 12 which meshes with the transmission gear 11 and functioning as a torque varying actuator for changing torque applied to the steering column 1.

The steering column 1 and the pinion shaft 3 are supported rotatably on a stationary member via bearings, and the first and second sun gears 4, 5 face coaxially the steering column 1 and the pinion shaft 3, respectively. A torque sensor (not shown) is provided on an outer periphery of the steering column 1 for detecting a torque applied to the steering column 1, and a control unit 14 is provided for controlling drive circuits 10a, 13a of the electric motors 10, 13 based on the torque detected by the torque sensor or the like.

In the planetary gear 6, the first toothed portion 61 which constitutes a straight-tooth spur gear portion and the second toothed portion 62 which constitutes a straight-tooth spur gear portion are disposed in such a manner as to be spaced apart in the tooth face direction, the numbers of teeth of the first toothed portion 61 and the second toothed portion 62 differ from each other. This planetary gear 6 is cold forged by means of a first die C having a first forming portion which corresponds to the first toothed portion 61 and a second die D having a second forming portion which corresponds to the second toothed portion 62.

Figure 3A:
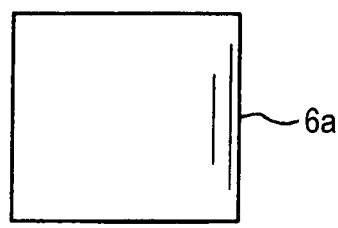
FIGS. 3A through 3D are explanatory diagrams showing a machining method of a planetary gear for the vehicle steering system according to the invention.
Figure 3B:
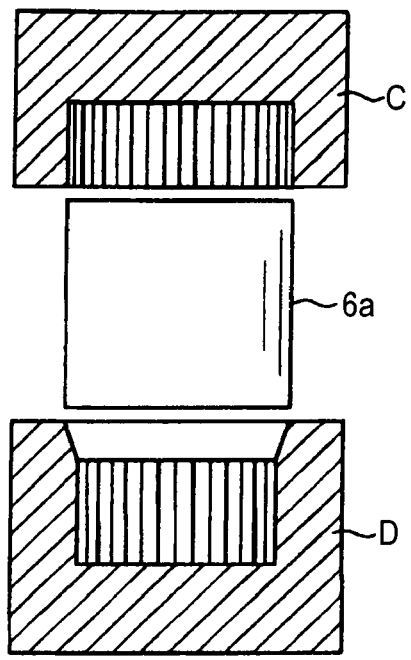
Figure 3C:
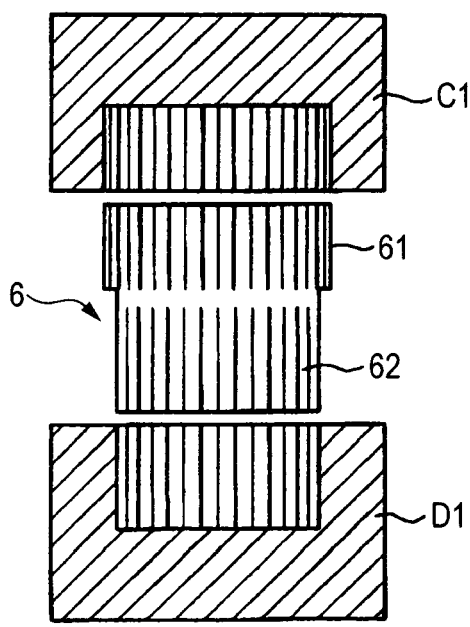
Figure 3D:
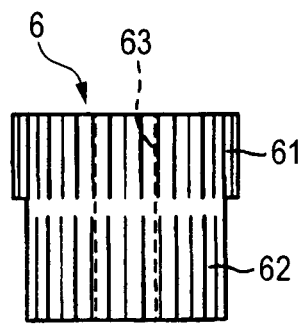

FIGS. 3A through 3D are explanatory diagrams showing a machining method. In cold forging a planetary gear 6, a gear wheel material 6a (FIG. 3A) that is formed by cutting a wire material to a predetermined length is disposed between a first performing die C and a second performing die D (FIG. 3B), and the second die D is moved vertically a plurality of times to beat the gear wheel material, so as to forge a first toothed portion 61 and a second toothed portion 62 at both end portions of the gear wheel material 6a. Thereafter, a finish forging is given to the first toothed portion 61 and the second toothed portion 62 by a first finishing die C1 and a second finishing case die D1, respectively (FIG. 3C). After a heat treatment such as quenching is given to the gear wheel material 6a so finished, a shaft hole 63 is opened in a central portion of a resulting forged gear 6 by a boring machine (FIG. 3D). A draft angle is set on first forming portions of the first dies C, C1 and second forming portions of the second dies D, D1. Consequently, tooth surfaces, tooth tip surfaces and tooth root surfaces of the first toothed portion 61 and the second toothed portion 62 are slightly inclined relative to a center axis of the gear 6 as a result of the provision of the draft angle in such a way as to correspond thereto.

In addition, the heat treatment of quenching may only have to be carried out as required and, hence, can be omitted.

The carrier 7 has a first disc-shaped plate portion 7a which is rotatably fitted to be supported on an outer circumferential portion of the steering column 1 via a needle bearing, a second disc-shaped plate portion 7b which is rotatably fitted to be supported on an outer circumferential portion of the pinion shaft 3 via a needle bearing, and a cylindrical connecting portion 7c which connects together the first plate portion 7a and the second plate portion 7b by means of connecting means such as bolts, and the annular externally toothed element 8 having a plurality of teeth is provided integrally on an outer circumferential portion of the cylindrical connecting portion 7c.

A first fitting hole 71 is provided in a rotational center portion of each of the first plate portion 7a and the second plate portion 7b, and two second fitting holes 72, 72 are also provided in each of the first and second plate portions in positions which are deflected from the rotational center portion and are located in such a manner as to divide the circumference of the plate portion into two equally. End portions of shaft elements 15 of the planetary gears 6 are fitted in the second fitting holes 72, 72 via needle bearings, respectively.

In the vehicle steering system configured as has been described heretofore, when the steering column 1 is operated to be turned by the steering wheel, the pinion shaft 3 is rotated via the first sun gear 4, the first toothed portions 61 and the second toothed portions 62 of the planetary gears 6, and the second sun gear 5. In addition, the electric motor 10 for differential actuator is driven by a command signal that is outputted to the drive circuit 10a from the control unit 14, whereby the carrier 7 is rotated via the first drive gear 9 and the externally toothed element 8, the pinion shaft 3 is then rotated at increased speeds via the first toothed portions 61 and the second toothed portions 62 of the planetary gears 6 and the sun gear 5, and the angle ratio of the steering angle of the steering column 1 to the turning angle of the steering mechanism 2 is changed.

When a torque being applied to the steering column is changed from a predetermined value due to the pinion shaft 3 being rotated at increased speeds, the electric motor 13 for torque changing is driven by a command signal outputted to the drive circuit 13a from the control unit 14 according to the torque applied to the steering column 1 or the like, thereby making it possible to maintain the torque applied to the steering column 1 at the predetermined value.

In addition, since the first toothed portion 61 and the second toothed portion 62 of the planetary gear 6 are formed integrally through cold forging, the number of machining steps of the planetary gear 6 can be decreased. Since the tooth surfaces of the first toothed portion 61 and the second toothed portion 62 which are formed through forging are pressure hardened, the heat treatment of quenching can be omitted. In addition, since the pressure hardened tooth surfaces are made smooth and moreover, the length of the non-toothed portion between the first toothed portion 61 and the second toothed portion 62 can be made shorter than that of the conventional planetary gear in which the two gear wheels are welded together, whether a planetary gear is formed through forging or cutting can easily be determined by looking at the tooth surfaces and the non-toothed portion.

Note that while in the embodiment that has been described heretofore, the planetary gear 6 is described as having the first toothed portion 61 and the second toothed portion 62 whose teeth are straight, the first toothed portion 61 and the second toothed portion 62 may have helical teeth.

The present application is based on Japanese Patent Application No. 2006-196146 filed on Jul. 18, 2007, the entire contents of which are incorporated herein by reference.

What is claimed is:

1. A vehicle steering system comprising:
a variable angle ratio mechanism for changing an angle ratio of a steering angle of a steering member to a turning angle of a steering mechanism, the variable angle ratio mechanism comprising:
a first sun gear connected to the steering member;
a second sun gear connected to the steering mechanism; and
planetary gears each having a first toothed portion and a second toothed portion which are adapted to mesh with the first and second sun gears, respectively, and are arranged to be spaced apart from each other in a tooth face width direction, the first toothed portion and the second toothed portion being formed integrally through forging.

2. A vehicle steering system according to claim 1, wherein the first toothed portion and the second toothed portion are formed from respective end edges in the tooth face width direction towards a center of the planetary gear.

3. A vehicle steering system according to claim 1, wherein the number of teeth of the first toothed portion differs from the number of teeth of the second toothed portion.

4. A vehicle steering system according to claim 1, wherein the forging is cold forging.

* * * * *